(12) United States Patent
Abhigyan et al.

(10) Patent No.: US 11,483,379 B2
(45) Date of Patent: Oct. 25, 2022

(54) ENHANCING NETWORK SERVICES BASED ON EDGE CLOUDS

(71) Applicant: AT&T Intellectual Property I, L.P., Atlanta, GA (US)

(72) Inventors: Abhigyan, Basking Ridge, NJ (US); Aleksandr Zelezniak, Morganville, NJ (US); Kaustubh Joshi, Short Hills, NJ (US); Oliver Spatscheck, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/099,313

(22) Filed: Nov. 16, 2020

(65) Prior Publication Data

US 2022/0159059 A1    May 19, 2022

(51) Int. Cl.
| | |
|---|---|
| *G06F 15/177* | (2006.01) |
| *H04L 67/10* | (2022.01) |
| *H04L 49/354* | (2022.01) |
| *H04L 12/46* | (2006.01) |
| *H04L 45/50* | (2022.01) |

(52) U.S. Cl.
CPC .......... *H04L 67/10* (2013.01); *H04L 12/4633* (2013.01); *H04L 12/4641* (2013.01); *H04L 45/50* (2013.01); *H04L 49/354* (2013.01)

(58) Field of Classification Search
CPC ... H04L 67/10; H04L 12/4641; H04L 49/354; H04L 45/50; H04L 12/4633; H04L 12/4666
See application file for complete search history.

(56) References Cited

U.S. PATENT DOCUMENTS

| | | | |
|---|---|---|---|
| 10,742,447 B2* | 8/2020 | Ritchie | ............... H04L 45/04 |
| 2016/0088092 A1* | 3/2016 | Cardona-Gonzalez | ...................... H04W 4/60 709/227 |
| 2016/0337175 A1* | 11/2016 | Rao | ...... H04L 12/4633 |
| 2018/0019927 A1* | 1/2018 | Addanki | ............ H04L 41/12 |
| 2019/0356599 A1* | 11/2019 | Brissette | ......... H04L 12/4675 |
| 2020/0396301 A1 | 12/2020 | Abhigyan et al. | |

\* cited by examiner

*Primary Examiner* — Cheikh T Ndiaye

(57) ABSTRACT

A method, computer-readable medium, and apparatus for supporting services for customer traffic using edge clouds are disclosed. For example, a processing system may receive an indication of a set of customer devices of a customer of a network provider and an indication of a service of an edge cloud to be applied to customer traffic of the customer devices, support configuration of a network of the network provider to support a customer segment for the customer including configuration of a gateway of the network and a switch of the network that is associated with the edge cloud, support configuration of a virtual network between the switch and an edge cloud element supporting the service, and support configuration of the switch to support an association of the customer segment and the virtual network for supporting routing of the customer traffic to the service via the virtual network.

20 Claims, 5 Drawing Sheets

ENHANCING NETWORK SERVICES BASED ON EDGE CLOUDS

The present disclosure relates generally to communication systems and, more particularly but not exclusively, to methods, computer-readable media, and apparatuses for enhancing network services based on edge clouds.

SUMMARY

In one example, the present disclosure describes a method, computer-readable medium, and apparatus for supporting enhanced services for customer traffic using edge clouds. For instance, a processing system including at least one processor may receive an indication of a set of customer devices of a customer of a network provider and an indication of a service of an edge cloud to be applied to customer traffic of the customer devices of the customer, support, based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic, support, based on the indication of the service of the edge cloud, configuration of a virtual network between the switch and an element of the edge cloud supporting the service of the edge cloud, and support, based on the customer segment and the virtual network, configuration of the switch to support an association of the customer segment and the virtual network for supporting routing of the customer traffic to the service of the edge cloud via the virtual network.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media, and apparatuses for supporting enhanced services for customer traffic using edge clouds. For instance, a processing system including at least one processor may receive an indication of a set of customer devices of a customer of a network provider and an indication of a service of an edge cloud to be applied to customer traffic of the customer devices of the customer, support, based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic, support, based on the indication of the service of the edge cloud, configuration of a virtual network between the switch and an element of the edge cloud supporting the service of the edge cloud, and support, based on the customer segment and the virtual network, configuration of the switch to support an association of the customer segment and the virtual network for supporting routing of the customer traffic to the service of the edge cloud via the virtual network. It is noted that these and other aspects of the present disclosure are described in greater detail below in connection with the discussion of FIGS. 1-5.

Figure 1:
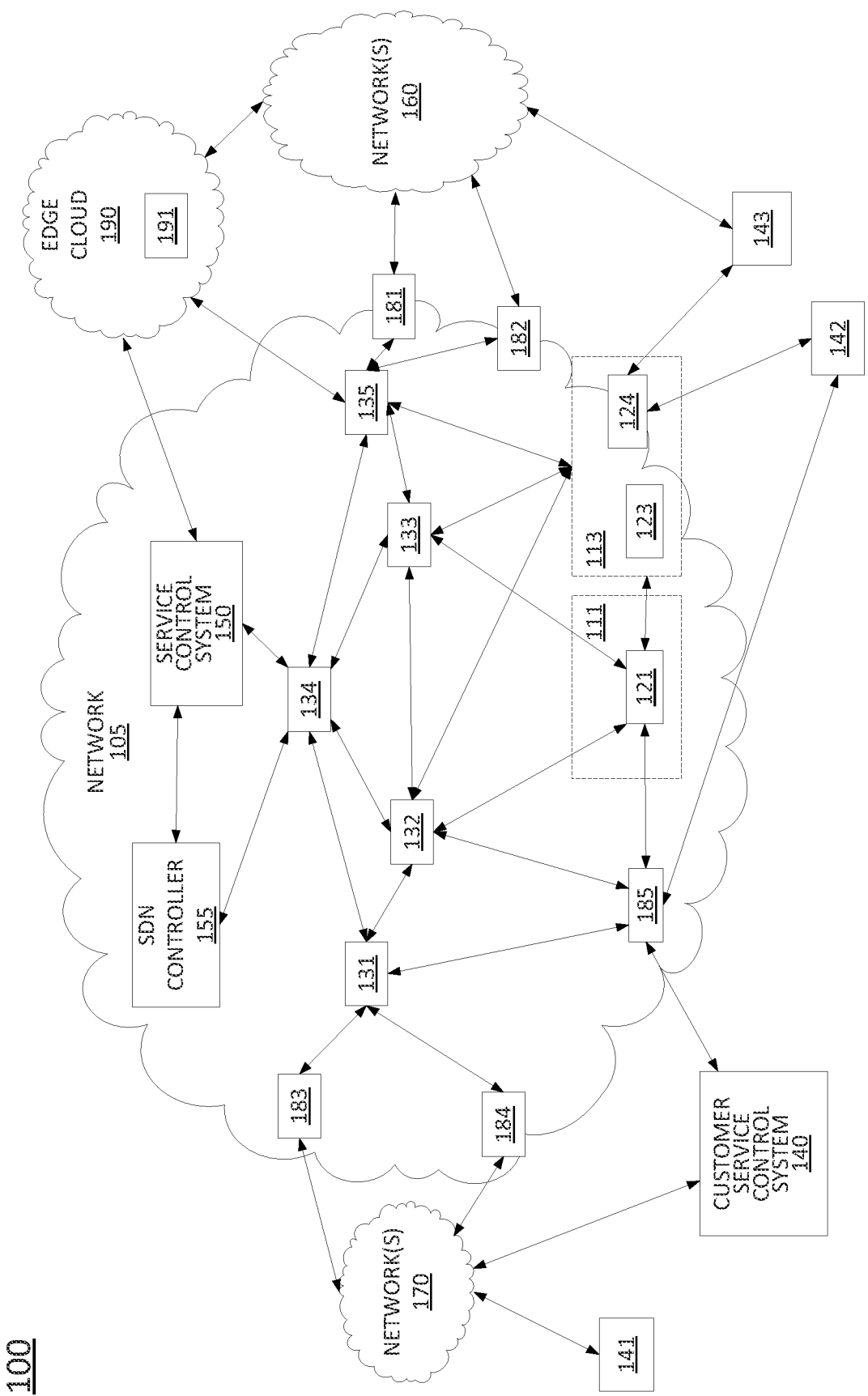
FIG. 1 illustrates an example system related to the present disclosure.

To better understand the present disclosure, FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network.

In one example, the network 105 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) including virtual network functions (VNFs). In other words, at least a portion of the network 105 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may include separate domains, e.g., separate routing domains from the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. For instance, the traffic may relate to management actions performed on the network 105 (e.g., management actions such as create/update/delete (CRUD) operations, queries, and so forth). User devices 141-143 may include, for example, cellular telephones, smart phones, personal computers, other wireless and wired computing devices, private branch exchanges, customer edge (CE) routers, media terminal adapters, cable boxes, home gateways and/or routers, and so forth.

In one example, user devices 141-143 may communicate with or may communicate via network 105 in various ways. For example, user device 141 may include a cellular telephone which may connect to network 105 via network 170, e.g., a cellular access network. For instance, such an example network 170 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may include a serving gateway (SGW), a mobility management entity (MME), or the like. In one example, user device 142 may include a customer edge (CE) router which may provide access to network 105 for additional user devices (not shown) which may be connected to the CE router. For instance, in such an example, component 185 may include a provider edge (PE) router.

As mentioned above, various components of network 105 may include virtual network functions (VNFs) which may physically include hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may include shared hardware, e.g., one or more host devices including line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may include host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server (MS), a domain name service (DNS) server, a packet data network (PDN) gateway (PGW), a gateway mobile switching center (GMSC), a short message service center (SMSC), etc.

In one example, network 105 includes a software defined network (SDN) controller 155. In one example, the SDN controller 155 may comprise a computing device or processing system (e.g., a server), such as computing system 500 depicted in FIG. 5, and may be configured to provide one or more operations or functions in connection with examples of the present disclosure for supporting enhanced services for customer traffic using edge clouds.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may include secure tunnels for signaling communications over an underling IP infrastructure of network 105. In other words, the control links may include virtual links multiplexed with transmission traffic and other data traversing network 105 and carried over a shared set of physical links. For ease of illustration the control links are omitted from FIG. 1. In one example, the SDN controller 155 also may include a virtual machine operating on NFVI/host device(s), or may include a dedicated device. For instance, SDN controller 155 may be collocated with one or more VNFs, or may be deployed in a different host device or at a different physical location.

In one example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In one example, SDN controller 155 may represent a processing system including a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

In one example, the network 105 may also include internal nodes 131-135, which may include various components, such as routers, switches, route reflectors, etc., cellular core network, IMS network, and/or VoIP network components, and so forth. In one example, these internal nodes 131-135 may also include VNFs hosted by and operating on additional NFVIs. For instance, as illustrated in FIG. 1, internal nodes 131 and 135 may include VNFs residing on additional NFVI (not shown) that are controlled by SDN controller 155 via additional control links. However, at least a portion of the internal nodes 131-135 may include dedicated devices or components, e.g., non-SDN reconfigurable devices.

In one example, the network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may include a serving gateway (SGW), a mobility management entity (MME), or the like. However, in another example, components 183 and 184 also may include PE routers interfacing with network(s) 170, e.g., for non-cellular network-based communications. In one example, components 181-185 also may include VNFs hosted by and operating on additional NFVI. However, in another example, at least a portion of the components 181-185 may include dedicated devices or components.

In one example, the network 105 may be in communication with an edge cloud 190. The edge cloud 190 may be operated by the network provider of the network 105 (e.g., in which case it may be considered to be a network edge cloud (NEC) of the network provider), an edge cloud provider other than the network provider of the network 105 (e.g., a network provider other than the network provider of the network 105, a data center operator, a service provider, or the like), and so forth. The term "edge cloud" as used herein generally refers to computing infrastructure deployed at the edge of a provider network (e.g., network 105) for service hosting, such as a set of compute resources (e.g., processor resources, memory resources, storage resources, and so forth) which may be deployed in geographic proximity to a set of end devices, thereby providing significant compute power (e.g., general-purpose compute capabilities that can support various different types of services which may be deployed and run) which is particularly well-suited to supporting processing-intensive services and providing relatively low latency (e.g., supporting low latency to the packet core so that use of the services does not incur additional wide-area propagation delay) which is particularly well-suited to supporting latency-sensitive services. For example, the term "edge cloud" may refer to a network edge cloud, which may be a mobile edge cloud based on multi-access edge computing (MEC) technology that is configured to provide a distributed computing environment for application and service hosting (e.g., a cellular operator may use MEC technology to efficiently deploy and host new applications and services for subscribers in a manner enabling processing of content close to the subscribers while reducing the signaling load on the core network) or which may be another suitable type of network edge cloud.

The edge cloud 190 includes various computing and communications resources which may support various services. These resource are presented by the element 191, which generally represents various types of elements which may be used to support a cloud architecture, including compute elements (e.g., physical servers, virtual servers, virtual machines (VMs), virtual containers (VCs), and so forth) which may be configured to host and run services and communications elements (e.g., routers, switches, and so forth) which may support transport of traffic of the services hosted and run by the compute elements. The element 191 of the edge cloud 190 (or any other element(s) of the edge cloud 190) may comprise a computing device or processing system (e.g., a server), such as computing system 500 depicted in FIG. 5, and may be configured to provide one or more operations or functions in connection with examples of the present disclosure for supporting enhanced services for customer traffic using edge clouds.

The edge cloud 190 interfaces with the network 105 in various ways, such as via the internal node 135 as illustrated in FIG. 1. In this context, for example, the internal node 135 may be a switch that is configured to support communications between the network 105 and the edge cloud 190. The communications between the network 105 and the edge cloud 190 may utilize various communications capabilities including, in one example, virtual tunnels or networks established between elements of the network 105 (illustrative, internal node 135, although it will be appreciated that other elements also or alternatively may be used) and elements of the edge cloud 190 (illustratively, device 191, although it will be appreciated that other elements also or alternatively may be used). It will be appreciated that, although depicted as interfacing with the network 105 via the internal node 135, the edge cloud 190 may interface with the network 105 via various other devices. It will be appreciated that, although only a single edge cloud 190 is depicted (for purposes of clarity), the network 105 may interface with multiple edge clouds 190 and, further, that such multiple edge clouds may interface with the network 105 at various strategic locations (e.g., geographic locations and/or network locations) in a manner that supports improvements to various aspects of communications between the network 105 and the edge clouds (e.g., reducing latency between the network 105 and the edge clouds, improving reliability between the network 105 and the edge clouds, and so forth) and, thus, which may support improvements to various aspects of capabilities provided by the edge clouds).

The edge cloud 190 may host various services which may be applied to customer traffic of customers of the network provider which operates the network 105. The network 105 may be configured to support routing of customer traffic of customer devices of customers to the edge cloud 190 for applying various services to the customer traffic before the customer traffic is further forwarded (e.g., further forwarded to an intended destination of the customer traffic where the customer traffic originates at customer devices of the customer or further forwarded to customer devices of the customer where the customer traffic is intended for delivery to the customer devices of the customer). For example, customer traffic associated with customer devices such as user devices 141-143 (e.g., originated by the user devices 141-143 or intended for delivery to the user devices 141-143) may be directed to the edge cloud 190 for application of services to the customer traffic before the customer traffic is further forwarded (e.g., further forwarded to the network 160 and/or the network 170 where the customer traffic was originated by the user devices 141-143 or further forwarded to the user devices 141-143 where the customer traffic originated remotely and is intended for delivery to the user devices 141-143).

In one example, the network 105 may be in communication with a customer service control system 140. The customer service control system 140 may comprise a computing device or processing system (e.g., a server), such as computing system 500 depicted in FIG. 5, and may be configured to provide one or more operations or functions in connection with examples of the present disclosure for supporting enhanced services for customer traffic using edge clouds.

The customer service control system 140 is operated by a customer of the network provider of the network 105. The customer may be a consumer (e.g., a family including a number of communication devices used by members of the family, a business including a number of communication devices used by employees of the business, and so forth), an Internet-of-Things (IoT) customer that operates IoT devices, an enterprise customer, and so forth. The customer service control system 140 is configured to enable the customer to request application of services of the edge cloud 190 to customer traffic of customer devices of the customer (e.g., all customer devices of the customer, one or more subsets of customer devices of the customer, and so forth). The customer service control system 140 may interface with the network 105 in various ways, such as via the network 170 or the component 185 as illustrated in FIG. 1. It will be appreciated that the customer service control system 140 may be configured to perform various other functions for supporting enhanced services for customer traffic using edge clouds, as discussed further herein.

It will be appreciated that, although presented as a separate system for purposes of clarity, the customer service control system 140 of the customer may be any element of the customer (including a customer device of the customer for which one or more services of the edge cloud 190 may be applied to customer traffic originating from the customer device or intended for delivery to the customer device).

In one example, the network 105 includes a service control system 150. The service control system 150 may comprise a computing device or processing system (e.g., a server), such as computing system 500 depicted in FIG. 5, and may be configured to provide one or more operations or functions in connection with examples of the present disclosure for supporting enhanced services for customer traffic using edge clouds.

The service control system 150 may be configured to support a capability for enabling customer devices of customers of the network provider of the network 105 to utilize services of the edge cloud 190. The service control system 150 may be configured to receive a request from a customer of the network provider of the network 105 to use a service of the edge cloud 190 and to perform various functions for enabling the customer of the network provider of the network 105 to use the service of the edge cloud 190. The service control system 150 may be configured to enable the customer of the network provider of the network 105 to send the request to use the service of the edge cloud 190 (e.g., providing the customer with information which may be used by the customer to send the request to use the service of the edge cloud 190). The service control system 150 may be configured to, based on the request from the customer of the network provider of the network 105 to use the service of the edge cloud 190, control configuration of the network 105 to enable the customer of the network provider of the network 105 to use the service of the edge cloud 190 (e.g., configuration of one or more devices of the network 105 to recognize customer traffic of customer devices of the customer for which the service of the edge cloud 190 is to be applied, configuration of one or more devices of the network 105 to route customer traffic of customer devices of the customer toward the edge cloud 190 for application of the service of the edge cloud 190 to the customer traffic, and so forth). The service control system 150 may be configured to, based on the request from the customer of the network provider of the network 105 to use the service of the edge cloud 190, control configuration of one or more devices of the edge cloud 190 to support application of the service of the edge cloud 190 to the customer traffic. The service control system 150 may be configured to perform various other functions to support the capability for enabling customer devices of customers of the network provider of the network 105 to utilize services of the edge cloud 190.

The service control system 150 may be configured to support a capability for enabling customer devices of customers of the network provider of the network 105 to utilize services of the edge cloud 190 based on a set of application programming interfaces (APIs) which may be configured to support the various functions associated with enabling customer devices of customers of the network provider of the network 105 to utilize services of the edge cloud. For example, the APIs may include customer-facing APIs configured to support communications with customer service control devices, such as customer service control system 140, to enable customers to request application of services of the edge cloud 190 to customer devices of the customers, e.g., exposing information indicative of available services of the edge cloud 190 for enabling selection of services of the edge cloud 190 by the customers, exposing information configured to enable customers to define sets of customer devices for which services of the edge cloud 190 are to be applied (e.g., parameters supported by the network 105 of the network provider for segmentation of customer traffic of customers within the network 105), and so forth. For example, the APIs may include provider-facing APIs, such as APIs for interfacing with the network 105 (e.g., for controlling configuration of the network 105 to support application of services of the edge cloud 190 to customer traffic of customers), APIs for interfacing with the edge cloud 190 (e.g., for controlling deployment of services within the edge cloud 190, for controlling configuration of the edge cloud 190 to support application of services of the edge cloud 190 to customer traffic of customers, and so forth), APIs for interfacing with systems of service providers where services of the edge cloud 190 are provided by entities other than the network provider (e.g., the customers, third-party service providers, and so forth), and so forth. It will be appreciated that various other types of APIs may be supported in order to enable the service control system 150 to support a capability for enabling customer devices of customers of the network provider of the network 105 to utilize services of the edge cloud 190.

It will be appreciated that the service control system 150 may be configured to perform various other functions for supporting enhanced services for customer traffic using edge clouds, as discussed further herein.

It should be noted that the system 100 has been simplified. In other words, the system 100 may be implemented in a different form than that illustrated in FIG. 1. For example, the system 100 may be expanded to include additional networks (e.g., a content distribution network (CDN), a network operations center (NOC) network, and the like), additional network devices (e.g., border devices, routers, switches, policy servers, security devices, gateways, and the like), additional service provider devices, additional customer devices, and so forth, without altering the scope of the present disclosure. In addition, system 100 may be altered to omit various elements, substitute elements for devices that perform the same or similar functions and/or combine elements that are illustrated as separate devices. For example, SDN controller 155, service control system 150, and/or other network devices may include functions that are spread across several devices that operate collectively as a SDN controller, a service control system, an edge cloud device, and so forth. Thus, these and other modifications of the system 100 are all contemplated within the scope of the present disclosure.

It is noted that various aspects of the present disclosure as discussed in FIG. 1 are described in greater detail below in connection with the discussion of FIGS. 2-5. To better understand the present disclosure, FIG. 2 illustrates a block diagram depicting one example of a communication network or system 200 for performing or enabling the steps, functions, operations, and/or features described herein.

Figure 2:
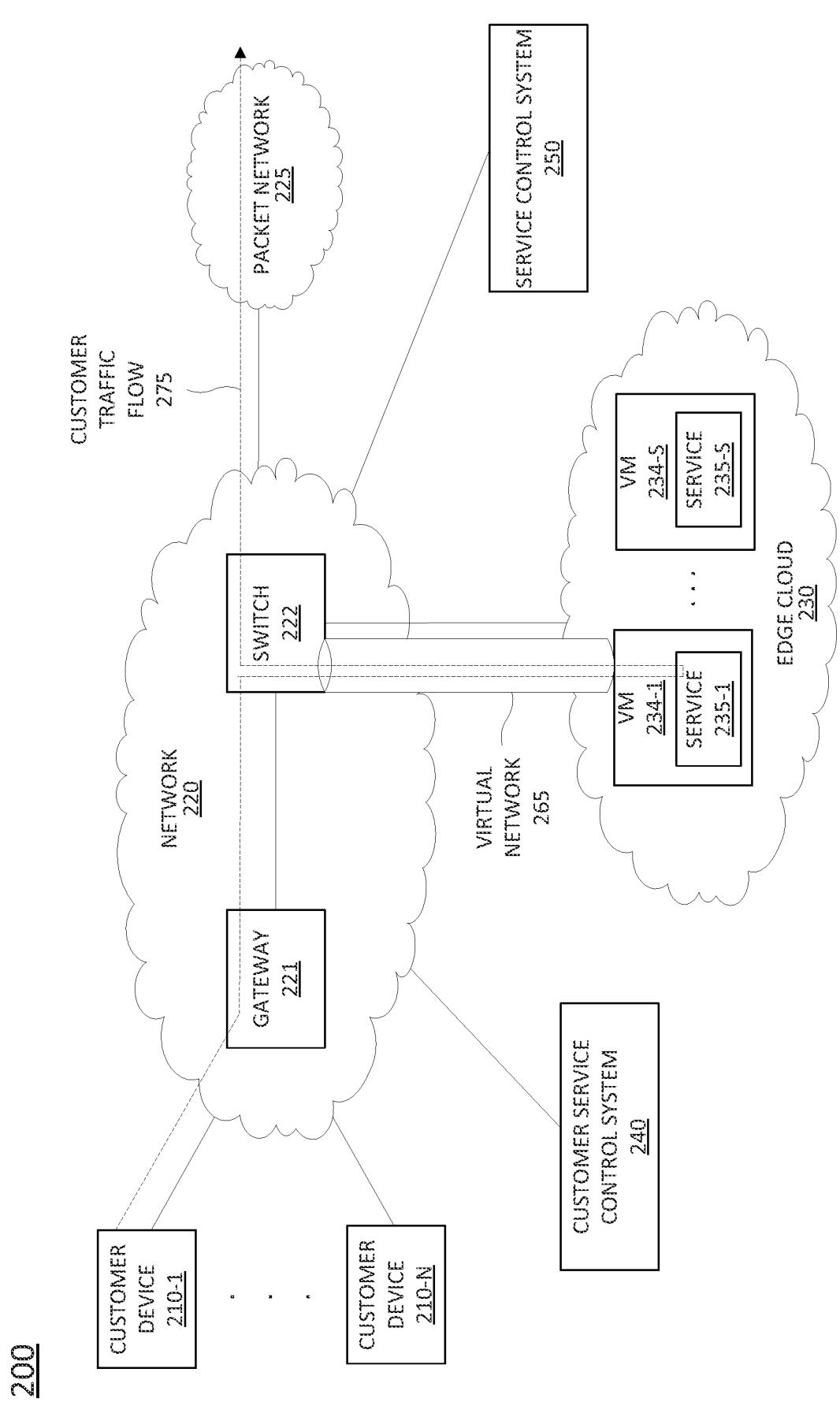
FIG. 2 illustrates an example system related to the present disclosure.

As illustrated in FIG. 2, system 200 may include a set of customer devices 210-1-210-N (collectively, customer devices 210), a network 220, a packet network 225, an edge cloud 230, a customer service control system 240, and a service control system 250.

The customer devices 210 may be devices configured to communicate via the network 220 and the packet network 225. The customer devices 210 may be devices of a customer of a network provider of the network 220. For example, the customer of the network provider of the network 220 may be a consumer (e.g., a family consumer including a number of communication devices used by family members, a business consumer including a number of communication devices used by employees, and so forth), an IoT customer that operates IoT devices, an enterprise customer, and so forth. For example, the customer devices 210 may include end user devices (e.g., cellular phones, smartphones, tablets, personal computers, gaming systems, cable boxes, home gateways, and so forth), IoT devices (e.g., sensors, actuators, and so forth), or various other devices of customers which may communicate via the network 220 and the packet network 225. The customer devices 210 may be configured to support various functions for supporting enhanced services for customer traffic using edge clouds, as presented herein. For example, the customer devices 210 may correspond to the user devices 141-143 of FIG. 1. In the example of FIG. 2, unless otherwise indicated it is assumed, for purposes of clarity, that the customer devices 210 are associated with a single customer.

The network 220 is a communication network configured to support communications of customer devices such as the customer devices 210. The network 220 is operated by a network provider. The network 220 may be based on various communications technologies, which may include various wireline and/or wireless technologies. The network 220 may include various network elements configured to support communications of the network 220, such as gateways, switches, routers, and so forth. For purposes of clarity in describing various functions for supporting enhanced services for customer traffic using edge clouds, two such elements are depicted (illustratively, a gateway 221 and a switch 222) while other elements of the network 220 are omitted. The network 220 may be configured to support various functions for supporting enhanced services for customer traffic using edge clouds, as presented herein. For example, the network 220 may correspond to the network 105 of FIG. 1.

The gateway 221 of the network 220 is configured to operate as a gateway to the network 220, and the various communication services supported by the network 220, for the customer devices 210. The gateway 221 may be configured to support various functions for supporting enhanced services for customer traffic using edge clouds (e.g., segmenting customer traffic of customers that is going to be forwarded to the edge cloud 230 for application of services of service providers to the customer traffic, forwarding of segmented customer traffic of customers to the switch 222 in a manner enabling the switch 222 to forward the segmented customer traffic to the edge cloud 230 for application of services of service providers to the customer traffic, and so forth), as presented herein. It is noted that the gateway 221 may correspond to different types of elements where the network 220 is based on different types of communications technologies (e.g., a PGW and/or SGW in a 4G network, a user plane function (UPF) in 5G network, and so forth). For example, the gateway 221 may correspond to the unit 121, the components 183 and/or 184, and/or other elements of the network 105 of FIG. 1.

The switch 222 of the network 220 is configured to operate as a switch for directing traffic, including customer traffic of the customer devices 210, in the network 220. The switch 222 may support transport of customer traffic that is not utilizing services of the edge cloud 230 between the customer devices 210 and the packet network 225. The switch 222 may support forwarding of customer traffic that is utilizing services of the edge cloud 190 between the network 220 and the edge cloud 230, as well as between the customer devices 210 and the packet network 225. The switch 222 may be configured to support various functions for supporting enhanced services for customer traffic using edge clouds (e.g., identifying customer traffic to be directed to the edge cloud 230 to support application of services of the edge cloud 230 to the customer traffic, directing the identified customer traffic to the edge cloud 230 to support application of services of the edge cloud to the customer traffic, and so forth). For example, the switch 222 may correspond to the internal nodes 131 and/or other elements of the network 105 of FIG. 1.

The packet network 225 may include one or more networks which may support communications of the customer devices 210 and various communication devices with which the customer devices 210 may communicate. The packet network 225 is connected to the network 220 for supporting communications of the customer devices 210. The packet network 225 also may be connected to the edge cloud 230 for direct communication between the packet network 225 and the edge cloud 230 that does not traverse the network 220. For example, the packet network 225 may include the Internet, Internet Service Provider (ISP) networks, public clouds, private data centers, enterprise networks, private networks, and so forth.

The edge cloud 230 is configured to support application of services of one or more service providers to customer traffic of the customer devices 210 of the customer of the network provider which operates the network 220. The edge cloud 230 may various elements configured to host various services which may be applied to customer traffic of customer devices 210 of the customer, illustratively, a set of VMs 234-1-234-5 (collectively, VMs 234) hosting a set of services 235-1-235-S (collectively, services 135), respectively. It will be appreciated that, although presented with respect to use of VMs 234 to host the services 235, various other types of elements may be used within the edge cloud 230 to host the services 235 (e.g., VCs, physical servers, and so forth). The edge cloud 230 may be configured to interface with the network 220 in order to support communication of customer traffic of customer devices 210 between the network 220 and the edge cloud 230 (e.g., from the network 220 to the edge cloud 230 for application of services to the customer traffic, from the edge cloud 230 to the network 220 after application of services to customer traffic for further forwarding of the modified customer traffic, and so forth). The edge cloud 230 may be operated by the network provider of the network 220, an edge cloud provider other than the network provider of the network 220 (e.g., a network provider other than the network provider of the network 105, a data center operator, a service provider, or the like), and so forth. For example, the edge cloud 230 may correspond to the edge cloud 190 of FIG. 1.

The services 235 may include various types of services which may be applied to customer traffic of customer devices 210. The service 235 may include various types of services which may be particularly well-suited for application in edge clouds, such as the edge cloud 230, due to various characteristics of edge clouds (e.g., the locations of the edge clouds relative to other supporting networks, the compute resources available in the edge clouds, and so forth). For example, the services 235 may include L4-L7 network services (e.g., a firewall service, a network address translation (NAT) service, an intrusion protection service, and so forth), a secure proxy service (e.g., a Hypertext Transfer Protocol Secure (HTTPS) proxy service), a data analytics service, a video monitoring and analysis service, an audio monitoring and analysis service, an Internet activity monitoring service, a parental control service, a malware removal service, a transparent caching service, a transparent transcoding service, an advertisement insertion service, and so forth. It will be appreciated that the types of services 235 which may be applied to the customer traffic of the customer devices 210 may vary across different customer types (e.g., network security services for enterprise mobility customers, security-based traffic analysis services for IoT customers, intrusion protection services for business consumer customers, family protection services and malware removal services for consumer mobility customers, and so forth). It will be appreciated that various other types of services may be included as part of the services 235 of the edge cloud 230.

The customer service control system 240 is operated by a customer of the network provider of the network 220. The customer service control system 240 is operated by the customer of the network provider of the network 220 that is associated with the customer devices 210. The customer service control system 240 is configured to enable the customer to request application of one or more of the services 235 of the edge cloud 230 to customer traffic of one or more of the customer devices 210 (e.g., all of the customer devices 210, one or more subsets of the customer devices 210, and so forth). The customer service control system 240 may interact with the service control system 250 to support requests for application of services 235 to customer traffic of customer devices 210. For example, in a home consumer context, a parent may use the customer service control system 240 to specify that a parental monitoring service is to be applied to traffic of the mobile devices of the children. For example, in a business consumer context, a business owner may use the customer service control system 240 to specify that an intrusion detection service is to be applied to traffic of all employees. For example, in an enterprise customer context, an information technology (IT) administrator of the enterprise may use the customer service control system 240 to specify that a firewall service is to be applied to traffic of mobile devices of employees of the enterprise. It will be appreciated that these are merely a few examples of the various ways in which application of services 235 of the edge cloud 230 to customer traffic of customer devices 210 may be configured using the customer service control system 240. For example, the customer service control system 240 may correspond to the customer service control system 140 of FIG. 1.

The service control system 250 is configured to enable application of one or more of the services 235 of the edge cloud 230 to customer traffic of one or more of the customer devices 210. The service control system 250 may be configured to enable application of one or more of the services 235 to customer traffic of one or more of the customer devices 210 by enabling the customer to request application of services 235 to customer traffic of one or more of the customer devices 210 (e.g., providing the customer with information which may be used by the customer to request application of services 235 to customer traffic of one or more of the customer devices 210) and by supporting configuration of the network 220 to support application of services 235 to customer traffic of one or more of the customer devices 210 (e.g., configuration of the gateway 221 to recognize customer traffic of customer devices 210 for which services 235 are to be applied and to forward the customer traffic for which services 235 of are to be applied toward the switch 222 in a manner for enabling the switch to recognize the customer traffic for which services 235 of are to be applied, configuration of the switch 222 to recognize the customer traffic for which services 235 of are to be applied and to route the customer traffic for which services 235 are to be applied toward the edge cloud 230 for application of the services 235 to the customer traffic of customer devices 210, configuration of connectivity between the network 220 and the edge cloud 230 for supporting communication of customer traffic of customer devices 210 for which the one or more services 235 are to be applied, and so forth). The service control system 250 may be configured to perform various other functions to enable application of one or more of the services 235 to customer traffic of one or more of the customer devices 210. For example, the service control system 250 may correspond to the service control system 150 of FIG. 1.

The system 200, as indicated above and discussed further below, is configured to support enhanced handling of the customer traffic of customer devices 210 using services 235 of the edge cloud 230. The service control system 250 may support onboarding of services 235 into the edge cloud 230, handling of requests by the customer for use of selected services 235 for customer traffic of specified customer devices 210, and configuration of the network 220 and the edge cloud 230 to support routing of the customer traffic of the specified customer devices 210 via the edge cloud 230 for application of the selected services 235 to the customer traffic of the specified customer devices 210. The customer service control system 240 may support, based on interaction with the service control system 250, definition of a customer-specific configuration for service insertion which specifies one or more services 235 that are to be used and one or more customer devices 210 for which the one or more services 235 are to be inserted into the data path for application of the selected services 235 to customer traffic of the specified customer devices 210. The service control system 250 may support, based on interaction with the network 220, configuration of the network 220, including the gateway 221 and the switch 222, to support routing of the customer traffic of the specified customer devices 210 via the edge cloud 230 for application of the selected services 235 to the customer traffic of the specified customer devices 210. The service control system 250 may support, based on interaction with the edge cloud 230, onboarding of the services 235 into the edge cloud 230 and configuration of the edge cloud 230 to support routing of the customer traffic of the specified customer devices 210 via the edge cloud 230 for application of the selected services 235 to the customer traffic of the specified customer devices 210. The network 220, after being configured to support application of the selected services 235 to the customer traffic of the specified customer devices 210, performs the routing of the customer traffic of the specified customer devices 210 via the edge cloud 230 for application of the selected services 235 to the customer traffic of the specified customer devices 210. It will be appreciated that the various networks, systems, elements, functions, and so forth, may interact in various other ways to support enhanced handling of the customer traffic of the customer devices 210 using services 235 of the edge cloud 230.

The service control system 250, as indicated above, supports onboarding of services 235 into the edge cloud 230. The services 235 that are deployed within the edge cloud 230 may be services developed by the network provider of the network 220 (e.g., in which case the network provider, which then is also the service provider, may simply deploy the services 235 within the edge cloud 230 and register the services 235 in the service control system 250). The services 235 that are deployed within the edge cloud 230 may be services developed by third-party service providers (e.g., in which case the third-party service provider may request to deploy the services 235 within the edge cloud 230, deploy the services 235 within the edge cloud 230 based on approval from the network provider to deploy the services 235 within the edge cloud 230, and register the services 235 with the service control system 250). The services 235 that are deployed within the edge cloud 230 may be services developed by the customer (e.g., in which case the customer may request to deploy the services 235 within the edge cloud 230, deploy the services 235 within the edge cloud 230 based on approval from the network provider to deploy the services 235 within the edge cloud 230, and register the services 235 with the service control system 250). The registration of a service 235 of the edge cloud 230 with the service control system 250 may include providing information about the service 235, such as a name of the service 235, a description of the service 235, features supported by the service 235, and so forth. It is noted that registration of services 235 of the service providers with the service control system 250 ensures that the services 235 are searchable and selectable by the customer, using the customer service control system 240, for enabling the customer to request application of specific ones of the services 235 of the edge cloud 230 to customer traffic of specific ones of the customer devices 210 based on interaction between the customer service control system 240 and the service control system 250.

The service control system 250, as indicated above, supports handling of requests by the customer for use of services 235 of the edge cloud 230 for customer traffic of the customer devices 210. The service control system 250 is configured to expose (e.g., using one or more customer-facing APIs and/or other suitable mechanisms) information which enables the customer to review and select services 235 to be applied to customer traffic of customer devices 210. The service control system 250 is configured to expose (e.g., using one or more customer-facing APIs and/or other suitable mechanisms) information which enables the customer to define the set customer devices 210 for which the selected service 235 of the edge cloud 230 is to be applied. The service control system 250 is configured to interact with the customer service control system 240 of the customer to enable the customer to request application of specific ones of the services 235 to customer traffic of specific ones of the customer devices 210. The customer service control system 240 is configured to support various functions, based on interaction with the service control system 250, which enable the customer of the customer devices 210 to request application of specific ones of the services 235 to customer traffic of specific ones of the customer devices 210 based on interaction with the service control system 250.

The service control system 250 and the customer service control system 240 cooperate to enable the customer of the customer devices 210 to define specific ones of the services 235 of the edge cloud 230 to be used and specific ones of the customer devices 210 for which the specific ones of the services 235 of the edge cloud 230 are to be used.

The customer may use the customer service control system 240 to define specific ones of the services 235 of the edge cloud 230 to be used for customer traffic of customer devices 210. The customer may use the customer service control system 240 to request a list of the services 235 available from the edge cloud 230. The service control system 250 receives the request for the list of services 235 available from the edge cloud 230 and responds by providing the list of services 235 available from the edge cloud 230 to the customer service control system 240. The customer service control system 240 receives the list of services 235 available from the edge cloud 230 and presents the list of services 235 available from the edge cloud 230 to the customer. The customer browses the list of services 235 available from the edge cloud 230 and selects one or more of the services 235 available from the edge cloud 230. The customer service control system 240 detects the selection of the one or more services 235 from the list of services 235 available from the edge cloud 230. The customer service control system 240 provides an indication of the selected one or more services 235 to the service control system 250, which may then utilize the indication of the selected one or more services 235 selected by the customer in order to configure the network 220 to support use of the selected one or more services 235 by the customer.

The customer may use the customer service control system 240 to specify the ones of the customer devices 210 for which the selected services 235 of the edge cloud 230 are to be applied. The customer uses the customer service control system 240 to request information regarding criteria which may be used to specify the ones of the customer devices 210 for which the selected services 235 are to be applied. The service control system 250 receives the request for the information regarding criteria which may be used to specify the ones of the customer devices 210 for which the selected services 235 are to be applied and responds by providing the information regarding criteria which may be used to specify the ones of the customer devices 210 for which the selected services 235 are to be applied. The customer service control system 240 receives the information regarding criteria which may be used to specify the ones of the customer devices 210 for which the selected services 235 are to be applied and presents the information regarding criteria which may be used to specify the ones of the customer devices 210 for which the selected services 235 are to be applied. The customer uses the information regarding criteria which may be used to specify the ones of the customer devices 210 for which the selected services 235 are to be applied to specify the ones of the customer devices 210 for which the selected services 235 are to be applied. The customer service control system 240 detects the specification of the ones of the customer devices 210 for which the selected services 235 are to be applied. The customer service control system 240 provides an indication of the specified ones of the customer devices 210 for which the selected services 235 are to be applied to the service control system 250, which may then utilize the indication of the specified ones of the customer devices 210 for which the selected services 235 are to be applied in order to configure the network 220 to support use of the selected one or more services 235 by the specified ones of the customer devices 210 for which the selected services 235 are to be applied.

The customer may specify particular ones of the customer devices 210 for which the selected services 235 of the edge cloud 230 are to be applied in various ways (e.g., based on various criteria, at various levels of granularity, or the like). For example, the customer may specify ones of the customer devices 210 by specifying that the selected services 235 are to be applied to customer traffic of all of the available customer devices 210 of the customer, specifying that the selected services 235 are to be applied to customer traffic of a subset of the available customer devices 210 of the customer (e.g., where the subset may be based on various criteria such as device type, user type, geographic location, and so forth), or the like. For example, an enterprise customer may specify that the selected services 235 are to be applied to traffic of all mobile devices of the enterprise customer, to traffic of all mobile devices of users who travel for the enterprise customer (e.g., salespeople, delivery people, and so forth), to traffic of all communication devices located in a particular country or particular enterprise customer building, and so forth. For example, an IoT customer may specify that the selected services 235 are to be applied to traffic of all IoT devices of the IoT customer, to traffic of a particular group of sensors of the IoT customer, and so forth. For example, a home consumer customer may specify that the selected services are to be applied to all devices on the account, only to the devices of the children, and so forth. It will be appreciated that the set of customer devices 210 of the customer for which the selected services 235 of the edge cloud 230 are to be applied may be organized in various other ways.

It will be appreciated that, although presented with respect to examples in which the selection by the customer of the one or more services 235 of the edge cloud 230 to be used and the selection by the customer of the one or more customer devices 210 to which the one or more services 235 of the edge cloud 230 are to be applied are performed serially or separately, in at least some examples these functions may be performed contemporaneously (e.g., the request by the customer from the customer service control system 240 may be a request for available service information for services 235 available from the edge cloud 230 as well as a request for information regarding criteria which may be used to specify the ones of the customer devices 210 for which the selected services 235 are to be applied, interactions between service control system 250 and the customer service control system 240 may use common messaging, and so forth).

It will be appreciated that the ones of the services 235 of the edge cloud 230 to be used for customer traffic of specified customer devices 210 of the customer and the ones of the customer devices 210 of the customer for which the selected services 235 of the edge cloud 230 are to be applied may be considered to be a customer-specific configuration for service insertion (e.g., for insertion of the ones of the services 235 to be used for customer traffic of customer devices 210 into the data path of the ones of the customer devices 210 for which the selected services 235 are to be applied) which may then be instantiated by the service control system 250 by configuring the network 220 to support routing of the customer traffic of the specified customer devices 210 to the selected services 235 for application of the services 235 to customer traffic of the specified customer devices 210.

The service control system 250, as indicated above, supports configuration of the network 220 to support the customer-specific configuration for service insertion. The service control system 250 supports configuration of the network 220 to support routing of the customer traffic of the specified customer devices 210 via the edge cloud 230 for application of the selected services 235 to the customer traffic of the specified customer devices 210. The configuration of the network 220 to support routing of the customer traffic of the specified customer devices 210 via the edge cloud 230 for application of the selected services 235 to the customer traffic of the specified customer devices 210 may include creation of a customer segment within the network 220 that supports segmentation of the specified customer devices 210 for which the selected services 235 are being used from other devices using the network 220 (and, thus, segmentation of the associated customer traffic of the customer devices 210). The creation of the customer segment within the network 220, which may include configuration of the network 220 to support the customer segment, may include configuration of the gateway 221 to identify customer traffic of the specified customer devices 210 and to forward the customer traffic of the specified customer devices 210 to the switch 222 in a manner that enables the switch 222 to identify the customer traffic of the specified customer devices 210 (e.g., based on a forwarding mechanism configured to enable the switch 222 to identify the customer traffic of the specified customer devices 210). The creation of the customer segment within the network 220, which may include configuration of the network 220 to support the customer segment, may include configuration of the switch 222 to use information associated with the customer segment to identify the customer traffic of the specified customer devices 210 (e.g., information indicative of a manner in which the gateway 221 is forwarding the customer traffic of the specified customer devices 210 toward the switch 222, thereby enabling the switch 222 to identify the customer traffic of the specified customer devices 210). The configuration of the network 220 to support routing of the customer traffic of the customer devices 210 via the edge cloud 230 for application of the selected services 235 to the customer traffic of the specified customer devices 210 may include creation of a virtual network between the network 220 and the edge cloud 230 (e.g., between the switch 222 and the element of the edge cloud 230 that hosts the selected service 235) for supporting forwarding of the customer traffic of the specified customer devices 210 to the edge cloud 230 for application of the selected services 235 to the customer traffic of the specified customer devices 210. The configuration of the network 220 to support routing of the customer traffic of the customer devices 210 via the edge cloud 230 for application of the selected services 235 to the customer traffic of the specified customer devices 210 may include attachment of the customer segment to the virtual network to support flow of customer traffic in a manner enabling application of selected services 235 to the customer traffic (e.g., association of the customer segment with the virtual network at the switch 222). It is noted that the service control system 250 also may support further configuration of the network 220 to support forwarding of modified customer traffic modified by the selected services 235 back to the network 220 for further forwarding (e.g., toward one or more intended destinations where the customer traffic originates at the customer devices 210 or toward the customer devices 210 where the customer traffic originates at one or more remote devices and is intended for delivery to the customer devices 210) where the further forwarding of the modified customer traffic is performed by the network 220 (a configuration, or topology type, which may be referred to herein as "hair-pinning") or may not need to perform such further configuration of the network 220 where the further forwarding of the modified customer traffic is performed by the edge cloud 230 rather than the network 220 (a configuration, or topology type, which may be referred to herein as "one-way"). It will be appreciated that various other network configuration operations may be performed by the service control system 250 to configure the network 220 to support routing of the customer traffic of the customer devices 210 via the edge cloud 230 for application of the selected services 235 to the customer traffic of the specified customer devices 210.

The creation of the customer segment that supports segmentation of the specified customer devices 210 for which the selected services 235 are being used, as indicated above, may include configuration of the gateway 221 to identify customer traffic of the specified customer devices 210. The gateway 221 may be configured to identify customer traffic of the specified customer devices 210 based on one or more segmentation parameters specified for identifying the customer traffic of the specified customer devices 210. The one or more segmentation parameters specified for identifying the customer traffic of the specified customer devices 210 may be selected from a set of available segmentation parameters supported by the gateway 221 for use in supporting customer segmentation. The set of available segmentation parameters supported by the gateway 221 for use in supporting customer segmentation may vary across various contexts (e.g., different network types, different network element types at which the segmentation of the customer traffic is applied, and so forth). For example, where the network 220 is a mobility network and the gateway 221 is a mobility gateway (e.g., a 4G PGW), the available segmentation parameters supported by the gateway 221 for use in supporting customer segmentation may include one or more of Access Point Name (apn-name), Cell Global Identity (cell-global-id), Charging Characteristics (charging-characteristics), Evolved Universal Mobile Telecommunications System (UMTS) Global Cell Identifier (eutran-cell-global-id), Gateway GPRS Support Node Name (ggsn-name), Home PLMN Identifier (home-plmnid), International Mobile Subscriber Identity Range (imsi-range), International Mobile Equipment Identity Range (imei-range), Gateway Name (gw-name), PGW Name (pgw-name), Radio Access Technology Type (rat-type), User Equipment (UE) IP Address (ue-ip-address), and so forth. The configuration of the gateway 221 to identify customer traffic of the specified customer devices 210 may include configuring the gateway 221 to use one or more of the available segmentation parameters supported by the gateway 221 for use in supporting customer segmentation for the customer. The service control system 250 may configure the gateway 221 to identify customer traffic of the specified customer devices 210 based on use of one or more segmentation parameters by sending one or more configuration messages to the gateway 221 (e.g., one or more configuration messages including instructions for configuring the gateway 221 to identify customer traffic based on the one or more segmentation parameters). It is noted that such configuration functions supported by the service control system 250 and the gateway 221 may be performed based on one or more APIs.

The configuration of the customer segment that supports segmentation of the specified customer devices 210 for which the selected services 235 are being used, as indicated above, may include configuration of the gateway 221 to forward the customer traffic of the specified customer devices 210 to the switch 222 in a manner that enables the switch 222 to identify the customer traffic of the specified customer devices 210. The gateway 221 may be configured to forward the customer traffic of the specified customer devices 210 to the switch 222, in a manner that enables the switch 222 to identify the customer traffic of the specified customer devices 210 and, based on modification of the customer traffic, based on tagging of the customer traffic, based on encapsulation or tunneling of the customer traffic, or the like, as well as various combinations thereof. For example, modification of the customer traffic by the gateway 221 to signal an indication of the customer segment may include modification of packets of the customer traffic of the specified customer devices 210 to include a source IP prefix for the customer segment or to include other types of information suitable to enable the switch 222 to identify the customer traffic of the specified customer devices 210. For example, tagging of the customer traffic by the gateway 221 to signal an indication of the customer segment may include tagging of packets of the customer traffic of the specified customer devices 210 using one or more types of tags, such as VLAN tags, MPLS tags, or the like. The configuration of the gateway 221 to forward the customer traffic of the specified customer devices 210 to the switch 222 in a manner that enables the switch 222 to identify the customer traffic of the specified customer devices 210 may include configuring the gateway 221 to apply one or more of the customer traffic indicator capabilities (e.g., modification, tagging, encapsulation or tunneling, and so forth) to indicate the customer segment of the customer traffic in a manner that may be used by the switch 222 for identifying the customer traffic of the specified customer devices 210. The service control system 250 may configure the gateway 221 to forward the customer traffic of the specified customer devices 210 to the switch 222 in a manner that enables the switch 222 to identify the customer traffic of the specified customer devices 210 by sending one or more configuration messages to the gateway 221 (e.g., one or more configuration messages including instructions for configuring the gateway 221 to apply one or more of the customer traffic indicator capabilities (e.g., modification, tagging, encapsulation or tunneling, and so forth)). It is noted that such configuration functions supported by the service control system 250 and the gateway 221 may be performed based on one or more APIs.

The configuration of the customer segment that supports segmentation of the specified customer devices 210 for which the selected services 235 are being used, as indicated above, may include configuration of the switch 222 to identify the customer traffic of the specified customer devices 210. The configuration of the switch 222 to identify the customer traffic of the specified customer devices 210 may include configuration of the switch 222 to identify the customer traffic of the specified customer devices 210 based on a mechanism used by the gateway 221 to segment the customer traffic of the specified customer devices 210. The configuration of the switch 222 to identify the customer traffic of the specified customer devices 210 may include configuration of the switch 222 to understand the manner in which the gateway 221 forwards the customer traffic of the specified customer devices 210 to the switch 222 such that the switch 222 is able to identify the customer traffic of the specified customer devices 210. The configuration of the switch 222 to understand the forwarding of the customer traffic of the specified customer devices 210 by the gateway 221 to the switch 222, in a manner that enables the switch 222 to identify the customer traffic of the specified customer devices 210, may include configuration of the switch 222 with information indicative of a manner in which the gateway 221 is forwarding the customer traffic of the specified customer devices 210 toward the switch 222 (e.g., an indication of a source IP address being used within the customer traffic to mark the customer traffic as belonging to the customer segment, a value of a tag being added to the customer traffic to mark the customer traffic as belonging to the customer segment, tunnel information used to identify a tunnel being used to transport the customer traffic of the customer segment, and so forth). The service control system 250 may configure the switch 222 to identify the customer traffic of the specified customer devices 210 based on a mechanism used by the gateway 221 to segment the customer traffic of the specified customer devices 210 by sending one or more configuration messages to the switch 222 (e.g., one or more configuration messages including instructions for configuring the switch 222 to recognize customer traffic based on one or more of the customer traffic indicator capabilities (e.g., modification, tagging, encapsulation or tunneling, and so forth)). It is noted that such configuration functions supported by the service control system 250 and the switch 222 may be performed based on one or more APIs.

It is noted that such configuration functions supported by the service control system 250 and the network 220 (e.g., the gateway 221 and the switch 222) for supporting creation of a customer segment within the network 220 (e.g., configuring the gateway 221 to identify customer traffic of the specified customer devices 210 and to forward the customer traffic of the specified customer devices 210 to the switch 222 in a manner that enables the switch 222 to identify the customer traffic of the specified customer devices 210 and configuring the switch 222 to identify customer traffic of the specified customer devices 210 based on knowledge of the manner in which the gateway 221 segments the customer traffic from other traffic in the network 220) may be performed based on one or more APIs. In one example, an API may be configured to support creation of a customer segment by receiving the customer segmentation parameters which are to be used as the basis for customer segmentation (e.g., APN, IMSI, IP address, and so forth) as input and providing a customer segment identifier (which may be used to map the customer segment created for the specified customer devices 210 of customer to the virtual network created for the specified customer devices 210) as an output. It will be appreciated that such an API may be configured to support the various configuration functions for configuring the network 220 to support the customer segment. It will be appreciated that various other APIs may be used to support such configuration functions.

The configuration of the network 220 to support routing of the customer traffic of the customer devices 210 via the edge cloud 230 for application of the selected services 235 to the customer traffic of the specified customer devices 210, as indicated above, may include creation of a virtual network between the network 220 and the edge cloud 230 for supporting forwarding of the customer traffic of the specified customer devices 210 to the edge cloud 230 for application of the selected services 235. The virtual network may be created between the switch 222 of the network 220 and VM 234 hosting the selected service 235 in the edge cloud 230. The virtual network may be created for supporting forwarding of customer traffic of the specified customer devices 210 to the selected service 235 (i.e., a one-way configuration, such as where the edge cloud 230 handles further forwarding of the customer traffic after the customer traffic is processed by the selected service 235) and, optionally for supporting forwarding of customer traffic of the specified customer devices 210 from the selected service 235 back to the network 220 (i.e., a hair-pinning configuration, such as where the network 220 handles further forwarding of the customer traffic after the customer traffic is processed by the selected service 235). The virtual network may be based on various virtualization technologies, e.g., the virtual network may be a virtual extensible local area network (VXLAN) or other suitable type of virtual network. The service control system 250 may create the virtual network between the switch 222 of the network 220 and the selected service 235 in the edge cloud 230 based on configuration of the switch 222 of the network 220 and VM 234 of the selected service 235 of the edge cloud 230 to support the virtual network. The service control system 250 may configure the switch 222 of the network 220 and the VM 234 of the selected service 235 of the edge cloud 230 to support the virtual network by sending one or more configuration messages to the switch 222 and sending one or more configuration messages to the VM 234 of the selected service 235 of the edge cloud 230. For example, a virtual network 265 is illustrated as being created between the switch 222 and the VM 234-1 hosting the service 235-1. It is noted that such configuration functions supported by the service control system 250, the switch 222, and the VM 234 hosting the service 235 may be performed based on one or more APIs.

It is noted that such configuration functions supported by the service control system 250 and the network components (e.g., the switch 222 of the network 220 and the VM 234 hosting the selected service 235 of the edge cloud 230) for supporting creation of the virtual network may be performed based on one or more APIs. In one example, an API may be configured to support creation of a virtual network by receiving an IP address of the VM 234 of the selected service 235 and an indication of a network type for the virtual network (e.g., whether the virtual network uses a one-way configuration or a hair-pinning configuration) as inputs and providing an IP address of the switch 222 and a virtual network identifier (e.g., a VXLAN ID where the virtual network is a VXLAN) as outputs. It will be appreciated that such an API may be configured to support the various configuration functions for configuring the network 220 and/or the edge cloud 230 (and, in particular, the VM 234 hosting the selected service 235) to support the virtual network. It will be appreciated that various other APIs may be used to support such configuration functions.

The configuration of the network 220 to support routing of the customer traffic of the specified customer devices 210 via the edge cloud 230 for application of the selected services 235 to the customer traffic of the specified customer devices 210, as indicated above, may include configuration of the network 220 to support attachment of the customer segment to the virtual network to support flow of customer traffic of the specified customer devices 210 in a manner enabling application of selected services 235 to the customer traffic of the specified customer devices 210. The configuration of the network 220 to support attachment of the customer segment to the virtual network, to support flow of customer traffic of the specified customer devices 210 in a manner enabling application of selected services 235 to the customer traffic of the specified customer devices 210, may include configuration of the switch 222 to associate the customer segment with the virtual network for supporting identification of the customer traffic of the specified customer devices 210 that is received at the switch 222 and to support forwarding of the customer traffic of the specified customer devices 210 from the switch 222 to the edge cloud 230 via the virtual network for application of the selected services 235. The configuration of the switch 222 to associate the customer segment with the virtual network may include configuration of the switch 222 to use information associated with the customer segment to identify the customer traffic of the specified customer devices 210 (e.g., information indicative of a manner in which the gateway 221 is forwarding the customer traffic of the specified customer devices 210 to enable the switch 222 to identify the customer traffic of the specified customer devices 210, such as an indication of a source IP address being used within the customer traffic to mark the customer traffic as belonging to the customer segment, a value of a tag being added to the customer traffic to mark the customer traffic as belonging to the customer segment, tunnel information used to identify a tunnel being used to transport the customer traffic of the customer segment, and so forth). The configuration of the switch 222 to associate the customer segment with the virtual network may include configuration of the switch 222 to use information associated with the virtual network to forward the customer traffic of the specified customer devices 210 via the virtual network for application of the services 235 to the customer traffic of the specified customer devices 210. The configuration of the switch 222 to associate the customer segment with the virtual network may include configuration of the switch 222 to maintain a mapping between an identifier of the customer segment (e.g., the identifier that is applied by the gateway 221 as the mechanism by which the gateway 221 indicates the customer traffic of the customer segment to the switch 222 such that the switch 222 may recognize the customer traffic) and an identifier of the virtual network (e.g., VXLAN ID where VXLAN is used, or any other suitable identifiers configured to enable the switch 222 to direct customer traffic of the customer segment onto the virtual network). For example, where VLAN tagging is used by the gateway 221 to mark the customer traffic of the customer segment and the virtual network is implemented as a VXLAN having an associated VXLAN ID, the switch 222 may recognize the VLAN tag on the packets of the customer traffic and use a mapping of the VLAN tag to the VXLAN ID that is maintained on the switch 222 in order to forward the packets of the customer traffic from the switch 222 to the VM 234 that is hosting the service 235 to be applied to customer traffic of the customer segment.

It is noted that such configuration functions supported by the service control system 250 and the network components (e.g., the switch 222 of the network 220) for supporting attachment of the customer segment to the virtual network may be performed based on one or more APIs. In one example, an API may be configured to support attachment of the customer segment for the customer to the virtual network created for the customer segment, in order to support flow of customer traffic in a manner enabling application of selected services 235 to the customer traffic, by receiving the customer segment identifier of the customer segment and the virtual network identifier of the virtual network as inputs and providing an as an output an indication as to whether attachment of the customer segment for the customer to the virtual network was a success or a failure. It will be appreciated that such an API may be configured to support the various configuration functions for configuring the network 220 (and, in particular, the switch 222) to support the attachment of the customer segment to the virtual network. It will be appreciated that various other APIs may be used to support such configuration functions.

The system 200, following configuration of the network 220 and the edge cloud 230 to support application of a selected service 235 of the edge cloud 230 to customer traffic of specified ones of the customer devices 210 of the customer, is configured to support routing of customer traffic such that the customer traffic is transported from its source to its intended destination with the selected service being applied to the customer traffic along the path. This is illustrated in FIG. 2 with an example of customer traffic originated by customer device 210-1 and intended for delivery to a destination reachable via the packet network 225. The customer device 210-1 is part of a customer segment that has been configured within the network 220 for supporting application of the service 235-1 of the edge cloud 230 to customer traffic of customer devices 210 of the customer segment based on use of the virtual network 265 created between the switch 222 of the network 220 and the VM 234-1 that hosts the service 235-1. The customer traffic is propagated from the customer device 210-1 to the network 220 and received by the gateway 221. The gateway 221 detects that the customer traffic belongs to the customer segment and forwards the customer traffic toward the switch 222 in a manner that enables the switch 222 to identify the customer traffic as belonging to the customer segment that needs to be forwarded to the service 235-1. The switch 222 uses an association between the customer segment and the virtual network 265 for the customer segment to forward the customer traffic to the VM 234-1 via the virtual network 265 (e.g., based on a mapping of the customer segment to the virtual network 265 that is maintained at the switch 222). For example, where VLAN tagging is used by the gateway 221 to mark the customer traffic of the customer segment and the virtual network 265 is implemented as a VXLAN having an associated VXLAN ID, the switch 222 may recognize the VLAN tag on the packets of the customer traffic and use a mapping of the VLAN tag to the VXLAN ID that is maintained on the switch 222 in order to forward the packets of the customer traffic from the switch 222 to the VM 234-1 via the virtual network 260 for application of the service 235-1 to the customer traffic. The VM 234-1 receives the customer traffic via the virtual network 265 and the service 235-1 processes the customer traffic. In this example, a hair-pinning configuration is used, rather than a one-way configuration, so the processed customer traffic is returned from the edge cloud 230 to the network 220, by the VM 234-1 to the switch 222, for further forwarding of the processed customer traffic by network 220 toward the packet network 225 for delivery of the processed customer traffic to the intended destination. This flow of the customer traffic is illustrated in FIG. 2 as customer traffic flow 275. It is noted that, although presented with respect to an example in which the processed customer traffic is returned from the edge cloud 230 to the network 220 using the virtual network 265, it is possible that the processed customer traffic may be returned from the edge cloud 230 to the network 220 in other ways (e.g., a separate virtual network created from the VM 234-1 of the edge cloud 230 to the switch 222 of the network 220, a different path from the edge cloud 230 to the network 220, and so forth).

It will be appreciated that, although primarily presented with respect to examples in which a single service 235 is applied to customer traffic of customer devices 210 of the customer, in at least some examples multiple services 235 may be applied to customer traffic of customer traffic of customer devices 210 of the customer (e.g., linearly as a service chain, contemporaneously, and so forth).

It will be appreciated that, although primarily presented with respect to examples in which routing of customer traffic through a service 235 may be supported using a single instance of the service 235 and a single primary communication path, in at least some examples routing of customer traffic through a service 235 may be supported using multiple instances of the service 235 (e.g., co-located in the same cloud location or located in different cloud locations) and multiple communication paths (e.g., a primary communication path and one or more backup or failover communication paths). For example, backup or failover may be supported using multiple paths through the gateway and switch, using multiple paths over multiple instances of the gateway and/or switch, using multiple packet core locations, using multiple edge cloud locations, and so forth. It will be appreciated that various other reliability capabilities may be applied for supporting application of enhanced services to customer traffic based on use of edge clouds.

It will be appreciated that, although primarily presented with respect to examples in which a single packet core location (e.g., switch 222 of network 220) supports a single edge cloud location (e.g., edge cloud 230) for supporting application of services to customer traffic of customers, in at least some examples multiple packet core locations may be used for supporting application of services to customer traffic of a customer and/or multiple edge clouds may be used for supporting application of services to customer traffic of a customer. It will be appreciated that various combinations of such arrangements may be used for supporting application of services to customer traffic of a customer. For example, a cloud VM at location X may be mapped to a packet core at location A and a cloud VM at location Y may be mapped to a packet core at locations B and C. For example, a cloud VM at location X may be mapped to a packet core at locations A and B, a cloud VM at location Y may be mapped to a packet core at locations C and D, and a cloud VM at location Z may be mapped to a packet core at location E. It will be appreciated that various other combinations of edge clouds/edge cloud locations and packet cores/packet core locations may be used for supporting application of services to customer traffic of a customer.

It will be appreciated that various APIs presented as being configured to support application of services to customer traffic of a customer using a single packet core location (e.g., switch 222) and a single edge cloud location (e.g., edge cloud 230) may be configured to support application of services to customer traffic of a customer using multiple packet core locations and/or multiple edge cloud locations. The customer segment creation, which may be performed using one or more APIs, may include creating a customer segment at each of the packet core locations (e.g., the input includes a list of customer segment parameters specified by the customer and the output includes a list of customer segment identifiers for the customer segments which have been created). The virtual network creation, which may be performed using one or more APIs, may include creating virtual networks for each pair of packet core location and associate edge cloud location (e.g., the inputs include the VM configuration information for the VMs (e.g., the IP addresses of the VMs, indications as to whether hair-pinning is to be used, and so forth) and the outputs include sets of virtual network configuration information for the virtual networks (e.g., the IP addresses of the VMs, the IP addresses of the core networks locations, and the VXLAN IDs or other suitable virtual network identifiers)). The attachment of the customer segments to the associated virtual networks, which may be performed using one or more APIs, may be performed using information from the customer segment creation and the virtual network creation (e.g., the inputs may include the lists of customer segment identifiers and virtual network identifiers and the outputs may include indications of success or failure in attaching the virtual networks to the customer segments).

Figure 3:
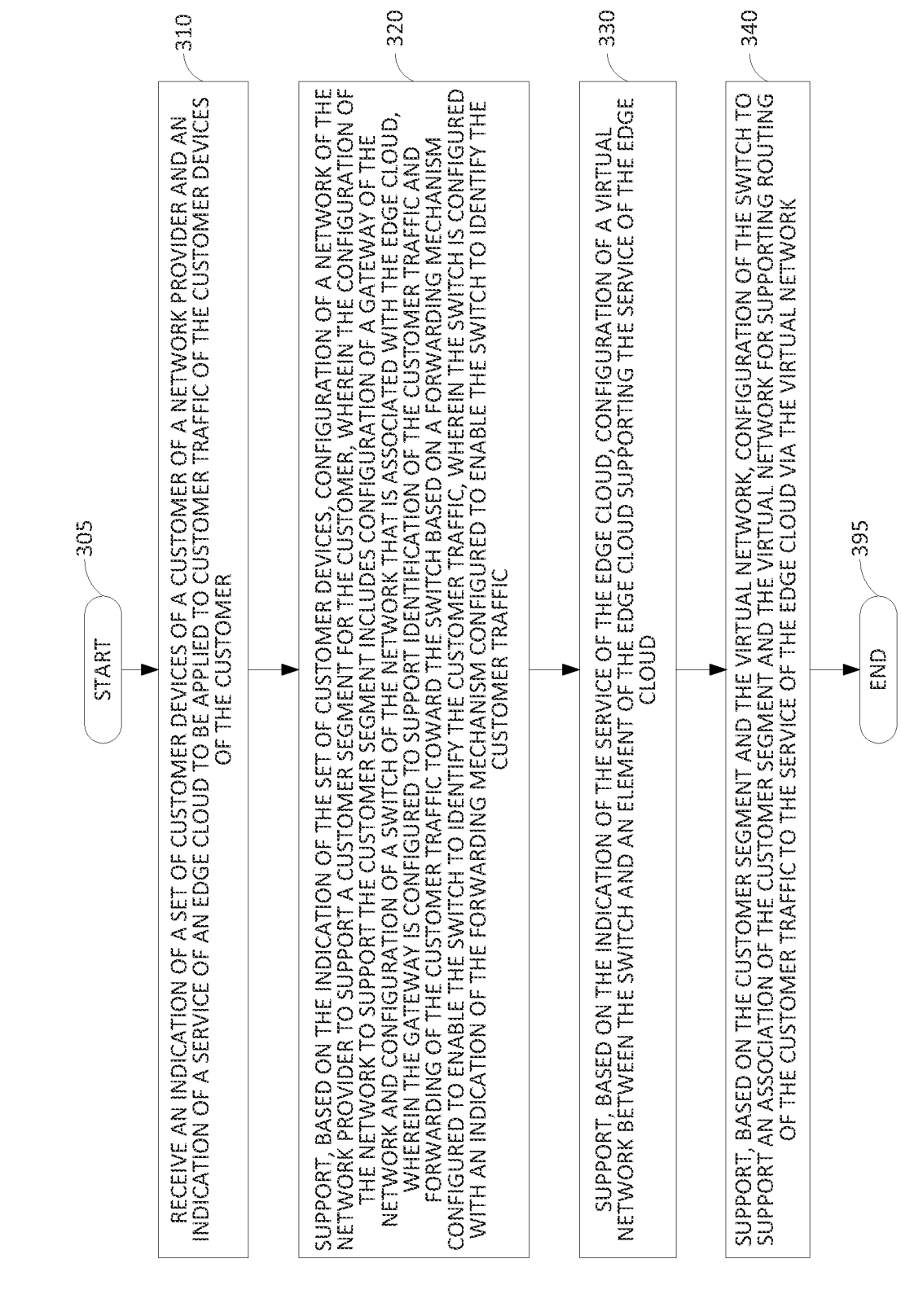
FIG. 3 illustrates a flowchart of an example method for use by a network system to support application of services to customer traffic, according to the present disclosure.

FIG. 3 illustrates a flowchart of an example method for use by a network system to support application of services to customer traffic, according to the present disclosure. In one example, the steps, operations, or functions of the method 300 may be performed by any one or more of the components of the system 100 depicted in FIG. 1 and/or any one or more of the components of the system 200 depicted in FIG. 2. For example, in one embodiment, the method 300 is performed by a service controller (e.g., service control system 150 of FIG. 1, service control system 250 of FIG. 2, and so forth). In another example, the method 300 is performed by a service controller in coordination with one or more other components of the system 100 and/or one or more other components of the system 200 of FIG. 2. In one example, the steps, functions, or operations of method 300 may be performed by a computing device or processing system, such as computing system 500 and/or a hardware processor element 502 as described in connection with FIG. 5 below. For instance, the computing system 500 may represent at least a portion of a service controller in accordance with the present disclosure. In one example, the steps, functions, or operations of method 300 may be performed by a processing system comprising a plurality of such computing devices as represented by the computing system 500. For illustrative purposes, the method 500 is described in greater detail below in connection with an example performed by a processing system.

The method 300 begins at step 305 and proceeds to step 310. At step 310, the processing system may receive an indication of a set of customer devices of a customer of a network provider and an indication of a service of an edge cloud to be applied to customer traffic of the customer devices of the customer. The set of customer devices of the customer may include a subset of available customer devices from a set of available customer devices of the customer. The subset of available customer devices is based on at least one of a user type, a device type, or a geographic location.

At step 320, the processing system may support, based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic. In one example, the identification of the customer traffic is based on at least one of an access point name, a cell global identity, a charging characteristic, an evolved universal mobile telecommunications system global cell identifier, a gateway general packet radio service support node name, a home public land mobile network identifier, an international mobile subscriber identity range, an international mobile equipment identity range, a gateway, a packet data network gateway name, a radio access technology type, or a user equipment internet protocol address. In one example, the forwarding of the customer traffic toward the switch based on the forwarding mechanism configured to enable the switch to identify the customer traffic includes modification of packets of the customer traffic to include a source internet protocol prefix indicative of the customer segment. In one example, the forwarding of the customer traffic toward the switch based on the forwarding mechanism configured to enable the switch to identify the customer traffic includes marking of packets of the customer traffic with an identifier indicative of the customer segment. In one example, the identifier indicative of the customer segment includes a virtual local area network tag or a multiprotocol label switching label. In one example, the forwarding of the customer traffic toward the switch based on the forwarding mechanism configured to enable the switch to identify the customer traffic includes encapsulation of packets of the customer traffic for tunneling from the gateway to the switch. In one example, supporting configuration of the network to support the customer segment for the customer includes receiving an indication of a set of parameters selected for the customer segment and providing an indication of a customer segment identifier configured to identify the customer segment within the network.

At step 330, the processing system may support, based on the indication of the service of the edge cloud, configuration of a virtual network between the switch and an element of the edge cloud supporting the service of the edge cloud. In one example, supporting configuration of the virtual network between the switch and the element of the edge cloud supporting the service of the edge cloud includes receiving an indication of an address of the element of the edge cloud and an indication of a topology type for the virtual network and providing an indication of an address of the switch of the network of the network to which the virtual network is connected and an indication of a virtual network identifier assigned for the virtual network. In one example, the virtual network includes a virtual extensible local area network.

At step 340, the processing system may support, based on the customer segment and the virtual network, configuration of the switch to support an association of the customer segment and the virtual network for supporting routing of the customer traffic to the service of the edge cloud via the virtual network. In one example, the customer segment has a customer segment identifier associated therewith and the virtual network has a virtual network identifier associated therewith, and the association of the customer segment and the virtual network is based on an association of the customer segment identifier and the virtual network identifier. In one example, the customer segment identifier includes an identifier for the forwarding mechanism configured to enable the switch to identify the customer traffic. In one example, supporting configuration of the switch to support the association of the customer segment and the virtual network includes providing a customer segment identifier of the customer segment and a virtual network identifier of the virtual network and receiving an indication as to whether the association of the customer segment and the virtual network was successful. In one example, supporting configuration of the switch to support the association of the customer segment and the virtual network includes sending, toward the switch, a mapping of a customer segment identifier of the customer segment and a virtual network identifier of the virtual network.

Following step 340, the method 300 proceeds to step 395 where the method 300 ends.

In addition, although not specifically specified, the method 300 may include one or more additional steps. For example, the method 300 may include receiving, from a control device of the customer, a request for a list of available services available in the edge cloud and sending, toward the control device of the customer, the list of available services available in the edge cloud. For example, the method 300 may include receiving, from a control device of the customer, a request for a list of customer segmentation parameters supported by the gateway for segmenting customer traffic within the network and sending, toward the control device of the customer, the list of customer segmentation parameters supported by the gateway for segmenting customer traffic within the network.

In addition, although not specifically specified, one or more steps, functions, or operations of the method 300 may include a storing, displaying and/or outputting step as required for a particular application. In other words, any data, records, fields, and/or intermediate results discussed in the method 300 can be stored, displayed, and/or outputted either on the device executing the respective method or to another device, as required for a particular application.

Figure 4:
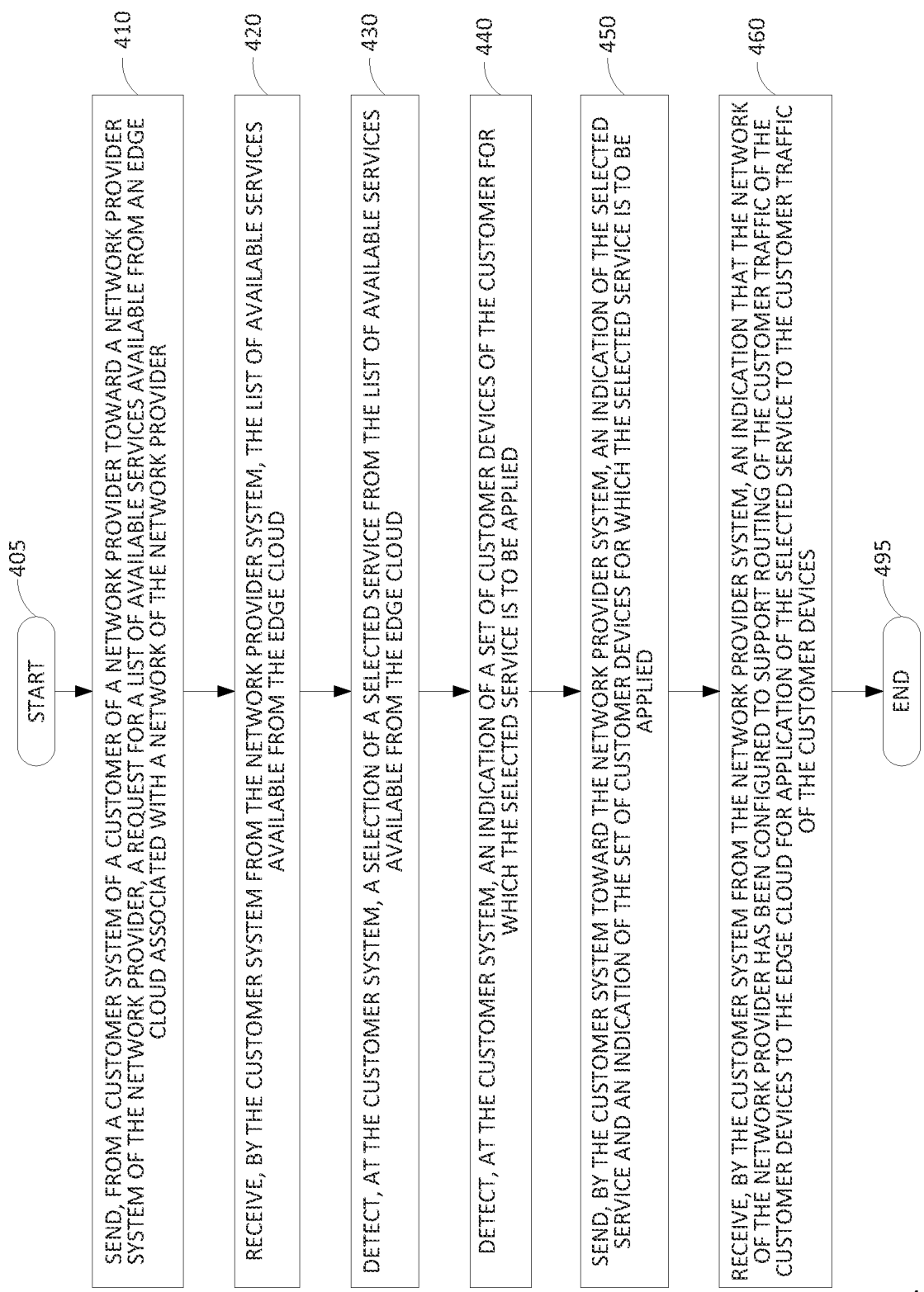
FIG. 4 illustrates a flowchart of an example method for use by a customer device to support application of services to customer traffic, according to the present disclosure.

FIG. 4 illustrates a flowchart of an example method for use by a customer system to support application of services to customer traffic, according to the present disclosure. In one example, the steps, operations, or functions of the method 400 may be performed by any one or more of the components of the system 100 depicted in FIG. 1 and/or any one or more of the components of the system 200 depicted in FIG. 2. For example, in one embodiment, the method 400 is performed by a customer system (e.g., customer service control system 140 of FIG. 1, customer service control system 240 of FIG. 2, and so forth). In another example, the method 400 is performed by a service controller in coordination with one or more other components of the system 100 and/or one or more other components of the system 200 of FIG. 2. In one example, the steps, functions, or operations of method 400 may be performed by a computing device or processing system, such as computing system 500 and/or a hardware processor element 502 as described in connection with FIG. 5 below. For instance, the computing system 500 may represent at least a portion of a service controller in accordance with the present disclosure. In one example, the steps, functions, or operations of method 400 may be performed by a processing system comprising a plurality of such computing devices as represented by the computing system 500. For illustrative purposes, the method 500 is described in greater detail below in connection with an example performed by a processing system.

The method 400 begins at step 405 and proceeds to step 410. At step 410, the processing system may send, from a customer system of a customer of a network provider toward a network provider system of the network provider, a request for a list of available services available from an edge cloud associated with a network of the network provider. The request may be initiated by a user of the customer system using one or more interaction interfaces of customer system (e.g., a graphical user interface, a touchscreen interface, a mouse and keyboard, and so forth). The request for the list of available services available from the edge cloud may be sent based on an API.

At step 420, the processing system may receive, by the customer system from the network provider system, the list of available services available from the edge cloud. The list of available services may be presented to a user of the customer system using one or more presentation interfaces of the customer system (e.g., a monitor or other display device). The list of available services may be received based on an API.

At step 430, the processing system may detect, at the customer system, a selection of a selected service from the list of available services available from the edge cloud. The detection of the selection of the selected service may be based on display of the list of available services via one or more presentation interfaces of the customer system and detection of an indication of the selection of the selected service based on interaction with the displayed list of available services using one or more interaction interfaces of the customer system (e.g., one or more presses of a touchscreen for highlighting and selecting the selected service, one or more mouse clicks for highlighting and selecting the selected service, and so forth).

At step 440, the processing system may detect, at the customer system, an indication of a set of customer devices of the customer for which the selected service is to be applied. The detection of the indication of the set of customer devices for which the selected service is to be applied may be based on a capability for enabling definition of the set of customer devices for which the selected service is to be applied. The detection of the indication of the set of customer devices for which the selected service is to be applied may be based on a request/response interaction, such as where the processing system sends a request for information configured to support selection of the set of customer devices for which the selected service is to be applied, receives a response including the information configured to support selection of the set of customer devices for which the selected service is to be applied, and detects the indication of the set of customer devices for which the selected service is to be applied based on use of and/or interaction with the information configured to support selection of the set of customer devices for which the selected service is to be applied. In the request/response interaction, the interaction may be with the network provider system, may be based on one or more APIs configured to expose to the customer the information configured to support selection of the set of customer devices for which the selected service is to be applied, and so forth. The detection of the indication of the set of customer devices for which the selected service is to be applied may be based on display of information via one or more presentation interfaces of the customer system and detection of selections based on interaction with the displayed information using one or more interaction interfaces of the customer system (e.g., one or more presses of a touchscreen for highlighting and selecting the selected service, one or more mouse clicks for highlighting and selecting the selected service, and so forth).

At step 450, the processing system may send, by the customer system toward the network provider system, an indication of the selected service and an indication of the set of customer devices for which the selected service is to be applied. The network provider system may then use the indication of the selected service and the indication of the set of customer devices for which the selected service is to be applied in order to configure the network of the network provider to route customer traffic of the customer devices to the selected service in the edge cloud. As discussed herein, the configuration of the network of the network provider to route customer traffic of the customer devices to the selected service in the edge cloud may include configuration of a gateway of the network of the network provider to identify customer traffic of the customer devices and to forward the customer traffic of the customer devices to a switch of the network of the network provider that is associated with the edge cloud, configuration of the switch of the network of the network provider that is associated with the edge cloud to identify customer traffic of the customer devices and to forward the customer traffic of the customer devices to the edge cloud for application of the selected service, configuration of a virtual network between the switch of the network of the network provider that is associated with the edge cloud and the selected service, or the like), and so forth.

At step 460, the processing system may receive, by the customer system from the network provider system, an indication that the network of the network provider has been configured to support routing of the customer traffic of the customer devices to the edge cloud for application of the selected service to the customer traffic of the customer devices (e.g., configuration of a gateway of the network to identify customer traffic of the customer devices and to forward the customer traffic of the customer devices to a switch of the network, configuration of the switch of the network that is associated with the edge cloud to identify customer traffic of the customer devices and to forward the customer traffic of the customer devices to the edge cloud for application of the selected services, and so forth. This indication may be presented via one or more presentation interfaces configured to present information to one or more users at the customer that the selected service will be applied to customer traffic of the customer devices.

Following step 460, the method 400 proceeds to step 495 where the method 400 ends.

In addition, although not specifically specified, one or more steps, functions, or operations of the method 400 may include a storing, displaying, and/or outputting step as required for a particular application. In other words, any data, records, fields, and/or intermediate results discussed in the method 400 can be stored, displayed, and/or outputted either on the device executing the respective method or to another device, as required for a particular application.

Additionally, steps, blocks, functions, or operations in FIG. 3 or FIG. 4 that recite a determining operation or involve a decision do not necessarily require that both branches of the determining operation be practiced. In other words, one of the branches of the determining operation can be deemed as an optional step. Moreover, steps, blocks, functions, or operations of the above-described methods 300 and 400 can be combined, separated, omitted, and/or performed in a different order from that described above, without departing from the examples of the present disclosure.

The present disclosure describes various mechanisms for network providers to insert added functionality to a network service (such as a wireless service) while allowing the added functionality to be customized on a per-customer basis, e.g., a security service specifically for IoT devices, to better meet their needs. The added functionalities may be provided by a third party service running on a network edge cloud, which provides sufficient compute capability to run these additional services right on the network edge. Further, the network edge cloud may enjoy a low-latency to network gateways or may even be co-located with network gateways. As such, inserting additional functionality is not expected to affect wide-area propagation latency by a significant amount. The various mechanisms may support configuration changes to the network edge cloud, which makes deployment easier. The various mechanisms may support deployment of services on cloud platforms by third-party providers, such that there may be a rich set of added functionality that customers can insert into their network services from network providers. The various mechanisms may provide an enabling technology for a network provider to differentiate its services and also provide value to the customers. The various mechanisms may support enhancement of network service for targeted groups of users (e.g., users from a specific business customer) based on support for identification of groups of users at the network gateway and routing of traffic from these customers via the chosen services providing the additional functionality. It is noted that such capabilities may be supported without adding new network elements to network edge cloud.

The present disclosure describes various mechanisms for network providers to insert added functionality to a network service based on a set of APIs which may be referred to collectively as a service insertion API. Some APIs may be geared toward third-party service providers, which may onboard service instances in a network cloud and register them via the APIs. Other APIs may be focused toward customers, who request which service they want inserted on-path and traffic from which group of users should be routed via the inserted service. Internally, the service insertion API may performs the necessary connectivity on the network gateway (e.g., 4G S/P-GW, 5G UPF, or the like) and hardware switches on the network cloud to tunnel the traffic via the selected third-party service instance, which providing necessary information to third-party service operators to complete the tunnel configuration on their instances. The API exposes the capability available on network gateways to define user groups, which may be based on a number of criteria (e.g., on a wireless network, criteria such as apn-name, cell-global-id, ue-ip-address, and so forth). For example, APN name may be used as a criteria since wireless carriers use APN names to segregate customers, e.g., a separate APN for each enterprise customer, or a separate APN for IoT devices, or a separate APN for drones). The API may expose these groupings to customers, thereby allowing the customers to use one or more criteria to create a group of users for whom to provide additional functionality. While the gateway can identify a user group to provide added functionality, the switch(es) on the network edge cloud also need to identify the traffic from the user group and their traffic to the requested service. This can be achieved if the gateway itself assigns a separate pool of IP addresses to each user group. In this case, the switch can use source IP address to identify the user group and perform tunneling through the desired third-party service. On the other hand, if user group cannot be assigned a separate pool of IP addresses, then a tagging mechanism may be used to help identify the traffic from the user group.

Figure 5:
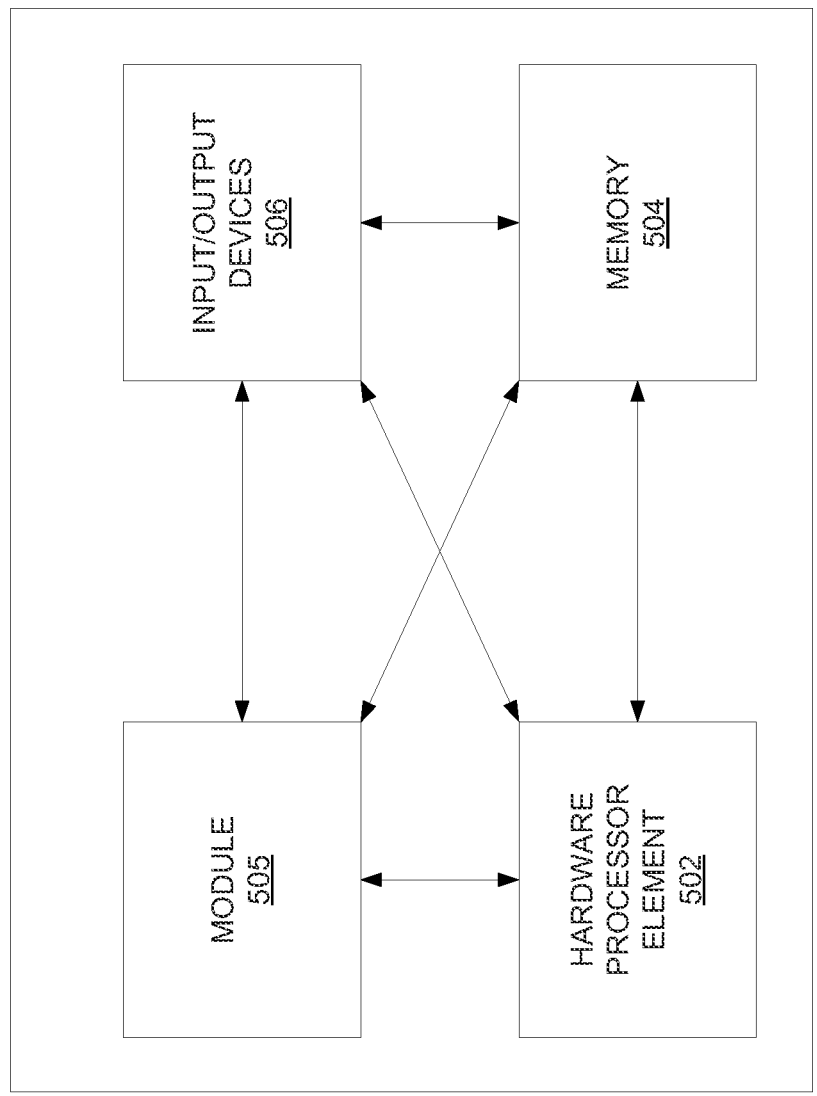
FIG. 5 illustrates a high-level block diagram of a computing device specially configured to perform the functions, methods, operations, and algorithms described herein.

FIG. 5 depicts a high-level block diagram of a computing system 500 (e.g., a computing device, or processing system) specifically programmed to perform the functions described herein. For example, any one or more components or devices illustrated in FIG. 1 or FIG. 2, or described in connection with the method 300 of FIG. 3 or the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for supporting enhanced services for customer traffic using edge clouds, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that, although only one hardware processor element 502 is shown, the computing device may employ a plurality of hardware processor elements. Furthermore, although only one computing device is shown in FIG. 5, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 5 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for supporting enhanced services for customer traffic using edge clouds (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for supporting enhanced services for customer traffic using edge clouds (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
receiving, by a processing system including at least one processor, an indication of a set of customer devices of a customer of a network provider and an indication of a service of an edge cloud to be applied to customer traffic of the set of customer devices of the customer;
supporting, by the processing system based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic, wherein the forwarding of the customer traffic toward the switch based on the forwarding mechanism configured to enable the switch to identify the customer traffic comprises at least one of: a modification by the gateway of packets of the customer traffic to include a source internet protocol prefix indicative of the customer segment or a tagging of packets of the customer traffic by the gateway with a virtual local area network tag or a multiprotocol label switching tag to indicate the customer segment;
supporting, by the processing system based on the indication of the service of the edge cloud, configuration of a virtual network between the switch and an element of the edge cloud supporting the service of the edge cloud; and
supporting, by the processing system based on the customer segment and the virtual network, configuration of the switch to support an association of the customer segment and the virtual network for supporting routing of the customer traffic to the service of the edge cloud via the virtual network, wherein the configuration of the switch to support the association of the customer segment and the virtual network comprises a configuration of the switch to maintain a mapping between an identifier of the customer segment and an identifier of the virtual network.

2. The method of claim 1, further comprising:
receiving, by the processing system from a control device of the customer, a request for a list of available services available in the edge cloud; and
sending, by the processing system toward the control device of the customer, the list of available services available in the edge cloud.

3. The method of claim 1, further comprising:
receiving, by the processing system from a control device of the customer, a request for a list of customer segmentation parameters supported by the gateway for segmenting customer traffic within the network; and
sending, by the processing system toward the control device of the customer, the list of customer segmentation parameters supported by the gateway for segmenting customer traffic within the network.

4. The method of claim 1, wherein the set of customer devices of the customer comprises a subset of available customer devices from a set of available customer devices of the customer.

5. The method of claim 4, wherein the subset of available customer devices is based on at least one of: a user type, a device type, or a geographic location.

6. The method of claim 1, wherein the identification of the customer traffic is based on at least one of: an access point name, a cell global identity, a charging characteristic, an evolved universal mobile telecommunications system global cell identifier, a gateway general packet radio service support node name, a home public land mobile network identifier, an international mobile subscriber identity range, an international mobile equipment identity range, a gateway, a packet data network gateway name, a radio access technology type, or a user equipment internet protocol address.

7. The method of claim 1, wherein the forwarding of the customer traffic toward the switch based on the forwarding mechanism configured to enable the switch to identify the customer traffic further comprises encapsulation of packets of the customer traffic for tunneling from the gateway to the switch.

8. The method of claim 1, wherein the supporting configuration of the network to support the customer segment for the customer comprises:
receiving, by the processing system, an indication of a set of parameters selected for the customer segment; and
providing, by the processing system, an indication of the identifier of the customer segment to identify the customer segment within the network.

9. The method of claim 1, wherein the supporting configuration of the virtual network between the switch and the element of the edge cloud supporting the service of the edge cloud comprises:
receiving, by the processing system, an indication of an address of the element of the edge cloud and an indication of a topology type for the virtual network; and
providing, by the processing system, an indication of an address of the switch of the network to which the virtual network is connected and an indication of the identifier of the virtual network assigned for the virtual network.

10. The method of claim 9, wherein the topology type for the virtual network comprises at least one of: hair pinning or one-way.

11. The method of claim 1, wherein the virtual network comprises a virtual extensible local area network.

12. The method of claim 1, wherein the identifier of the customer segment comprises an identifier applied by the gateway to enable the switch to identify the customer traffic.

13. The method of claim 1, wherein the supporting configuration of the switch to support the association of the customer segment and the virtual network comprises:
providing, by the processing system, the identifier of the customer segment and the identifier of the virtual network; and
receiving, by the processing system, an indication as to whether the association of the customer segment and the virtual network was successful.

14. The method of claim 1, wherein the supporting configuration of the switch to support the association of the customer segment and the virtual network comprises:
sending, by the processing system toward the switch, the mapping.

15. The method of claim 1, wherein the service of the edge cloud comprises at least one of: a firewall service, a network address translation service, an intrusion protection service, a secure proxy service, a data analytics service, a video monitoring and analysis service, an audio monitoring and analysis service, an internet activity monitoring service, a parental control service, a malware removal service, a transparent caching service, a transparent transcoding service, or an advertisement insertion service.

16. The method of claim 1, wherein the modification by the gateway alters the packets of the customer traffic as received by the gateway from the set of customer devices.

17. The method of claim 1, wherein the tagging by the gateway alters the packets of the customer traffic to include a tag that was not present in the packets as received by the gateway from the set of customer devices.

18. The method of claim 1, wherein the gateway is configured to support identification of the customer traffic and forwarding of the customer traffic toward the switch based on a forwarding mechanism configured to enable the switch to identify the customer traffic through a configuration message received by the gateway from a service control system.

19. A non-transitory computer-readable medium storing instructions which, when executed by a processing system including at least one processor, cause the processing system to perform operations, the operations comprising:
receiving an indication of a set of customer devices of a customer of a network provider and an indication of a service of an edge cloud to be applied to customer traffic of the customer devices of the customer;
supporting, based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic, wherein the forwarding of the customer traffic toward the switch based on the forwarding mechanism configured to enable the switch to identify the customer traffic comprises at least one of: a modification by the gateway of packets of the customer traffic to include a source internet protocol prefix indicative of the customer segment or a tagging of packets of the customer traffic by the gateway with a virtual local area network tag or a multiprotocol label switching tag to indicate the customer segment;
supporting, based on the indication of the service of the edge cloud, configuration of a virtual network between the switch and an element of the edge cloud supporting the service of the edge cloud; and
supporting, based on the customer segment and the virtual network, configuration of the switch to support an association of the customer segment and the virtual network for supporting routing of the customer traffic to the service of the edge cloud via the virtual network, wherein the configuration of the switch to support the association of the customer segment and the virtual network comprises a configuration of the switch to maintain a mapping between an identifier of the customer segment and an identifier of the virtual network.

20. An apparatus comprising:

a processing system including at least one processor; and a computer-readable medium storing instructions which, when executed by the processing system, cause the processing system to perform operations, the operations comprising:

receiving an indication of a set of customer devices of a customer of a network provider and an indication of a service of an edge cloud to be applied to customer traffic of the customer devices of the customer;

supporting, based on the indication of the set of customer devices, configuration of a network of the network provider to support a customer segment for the customer, wherein the configuration of the network to support the customer segment includes configuration of a gateway of the network and configuration of a switch of the network that is associated with the edge cloud, wherein the gateway is configured to support identification of the customer traffic and forwarding of the customer traffic toward the switch based on a forwarding mechanism configured to enable the switch to identify the customer traffic, wherein the switch is configured with an indication of the forwarding mechanism configured to enable the switch to identify the customer traffic, wherein the forwarding of the customer traffic toward the switch based on the forwarding mechanism configured to enable the switch to identify the customer traffic comprises at least one of: a modification by the gateway of packets of the customer traffic to include a source internet protocol prefix indicative of the customer segment or a tagging of packets of the customer traffic by the gateway with a virtual local area network tag or a multiprotocol label switching tag to indicate the customer segment;

supporting, based on the indication of the service of the edge cloud, configuration of a virtual network between the switch and an element of the edge cloud supporting the service of the edge cloud; and supporting, based on the customer segment and the virtual network, configuration of the switch to support an association of the customer segment and the virtual network for supporting routing of the customer traffic to the service of the edge cloud via the virtual network, wherein the configuration of the switch to support the association of the customer segment and the virtual network comprises a configuration of the switch to maintain a mapping between an identifier of the customer segment and an identifier of the virtual network.

\* \* \* \* \*